United States Patent [19]

Krutsinger et al.

[11] E Re. 29,296

[45] Reissued July 5, 1977

[54] DUAL SLOT MICROSTRIP ANTENNA DEVICE

[75] Inventors: Jack K. Krutsinger, Boulder; Carl N. Bullai, Longmont; Robert E. Munson, Boulder, all of Colo.

[73] Assignee: Ball Brothers Research Corporation, Boulder, Colo.

[22] Filed: July 16, 1975

[21] Appl. No.: 596,263

Related U.S. Patent Documents

Reissue of:

[64] Patent No.: 3,810,183
Issued: May 7, 1974
Appl. No.: 99,481
Filed: Dec. 18, 1970

[52] U.S. Cl. ..... 343/700 MS; 343/708; 343/769

[51] Int. Cl.[2] ..... H01Q 13/10; H01Q 1/28

[58] Field of Search ..... 343/769, 801, 846; 343/700 MS, 708

[56] References Cited

UNITED STATES PATENTS

| | | | |
|---|---|---|---|
| 2,234,234 | 3/1941 | Cork et al. | 343/791 |
| 2,455,224 | 11/1948 | Buchwalter et al. | 343/769 |
| 2,990,546 | 6/1961 | Haas | 343/705 |
| 3,016,536 | 1/1962 | Fubini | 343/801 |
| 3,139,619 | 6/1964 | Jones | 343/705 |
| 3,293,645 | 12/1966 | Farley et al. | 343/708 |
| 3,394,373 | 7/1968 | Makrancy | 343/769 |
| 3,475,755 | 10/1969 | Bassen et al. | 343/769 |
| 3,478,362 | 11/1969 | Ricardi et al. | 343/769 |
| 3,573,831 | 4/1971 | Forbes | 343/846 |
| 3,638,224 | 1/1972 | Bailey et al. | 343/771 |
| 3,710,338 | 1/1973 | Munson | 343/769 |

FOREIGN PATENTS OR APPLICATIONS

| | | | |
|---|---|---|---|
| 1,050,583 | 1/1954 | France | 343/705 |

*Primary Examiner*—Eli Lieberman
*Attorney, Agent, or Firm*—James D. Haynes

[57] ABSTRACT

A dual slot antenna assembly is disclosed herein and generally includes a pair of concentrically positioned and radially spaced cylindrical conductors defining a pair of circumferential slots which are longitudinally spaced one-half wavelength apart at the anticipated operating frequency of the antenna device. An electrical signal feed assembly is connected with the conductors for exciting the slots so as to provide overlapping radiation patterns emanating in the same direction.

7 Claims, 7 Drawing Figures

INVENTORS
CARL N. BULLAI
JACK K. KRUTSINGER
ROBERT E. MUNSON
BY Harris & O'Rourke
ATTORNEYS INVENTORS
CARL N. BULLAI
JACK K. KRUTSINGER
ROBERT E. MUNSON
BY Harris & O'Rourke
ATTORNEYS

DUAL SLOT MICROSTRIP ANTENNA DEVICE

Matter enclosed in heavy brackets[ ]appears in the original patent but forms no part of this reissue specification; matter printed in italics indicates the additions made by reissue.

BACKGROUND OF THE INVENTION

1. Field of the Invention

This invention relates generally to antenna assemblies and more particularly to a new and improved dual slot antenna assembly.

2. Description of the Prior Art

The use of antenna assemblies for both transmission and reception of radio signals is well known, and such antenna assemblies have taken many diverse dimensions and/or shapes to accomplish given objectives. Among such antennas known in the art are those useful in conjunction with propelled vehicles including missiles and more particularly missiles which carry instrument payloads for short term measurements of very high altitude environment data, which data is transmitted from an antenna mounted on a missile to receiving stations on the ground, which receiving stations are often ground tracking stations. However, monitoring has been found to be difficult due to signal nulls encountered as the vehicles assume different roll and aspect orientations.

Although the problem has been attacked in many ways, including the use of refined circuitry such as automatic gain control amplifiers which have to some effect alleviated the problem of antenna deficiencies, there still has been a need to improve the antennas so as to develop radiation patterns without signal lobes of varying strength. More particularly, the antenna should be characterized by an isotropic antenna radiation coverage, that is, a pattern of constant relative power for any orientation of the antenna. As such, the pattern coverage is then relatively constant regardless of the roll or aspect orientation of the rocket, thereby facilitating data monitoring at a tracking station. The avoidance of signal nulls as a characteristic of the antenna eliminates an important deficiency that has previously caused temporary loss of signal information, and in the case of an unrecovered rocket, permanent loss thereof.

Although some previous attempts have been made to design antennas having patterns more nearly isotropic for use in rockets carrying environmental data sensors and associated instruments for telemetry purposes and the like, such antennas have not completely solved the problems in all cases due to one or more of such diverse reasons as failing to satisfy strict aerodynamic design requirements, exhibiting intolerable signal variations in the aspect patterns (the signal pattern measured about the missile in a plane containing the missile) and/or in the roll patterns (the signal pattern measured about the missile in a plane perpendicular to the missile axis), requiring complicated and often expensive components due to complex design requirements, and/or requiring excessive time and/or material in assembly so as to make antenna costs too high for at least some intended uses. For example, the aspect and roll radiation patterns in some antennas of recent design have been found to fluctuate as much as 30 db from isotropic radiation, while the required dimensions and/or costs inherent in other such antennas have made these antennas unusable, or at least undesirable, for many intended uses.

SUMMARY OF THE INVENTION

The present invention overcomes the aforementioned disadvantages, as well as other disadvantages, by providing an antenna which has an improved signal radiation pattern and which is both simple in design and economical to make. In addition, the antenna is particularly useful in airborne telemetry vehicles, which assume many orientations relative to any given tracking station, since it may be easily flush-mounted to the vehicle so as to provide a low profile and thereby avoid any substantial increase in air drag.

As will be seen hereinafter, a preferred embodiment of the antenna assembly constructed in accordance with the present invention generally comprises a pair of laterally spaced-apart conductive elements defining a pair of longitudinally spaced radiation slots, each of which is of greater than the spacing between the conductive elements and each of which emanates radiation therefrom, the slots being electrically excited by an electrical feed assembly.

The antenna, constructed in the aforedescribed manner not only exhibits improved radiation patterns, but also is relatively simple in design and economical to produce, as will become more apparent hereinafter. It should be noted that the antenna assembly, as constructed, is similar in many respects to the "Single Slot Cavity Antenna Assembly" disclosed in an application, by Robert E. Munson et al. Ser. No. 99,434 and filed concurrently herewith. However, because of the dual slot feature, the antenna assembly of the present invention operates in an entirely different manner as will be seen hereinafter, and may be utilized in different operational environments. In addition, because of this dual slot feature, assemblage of the antenna assembly of the present invention is different than that of the single slot antenna assembly referred to hereinabove.

An object of the present invention is to provide a new and improved antenna assembly having an improved signal radiation pattern.

Another object of the present invention is to provide a new and improved antenna assembly which is both simple in design and economical to manufacture.

Still another object of the present invention is to provide a new and improved antenna assembly which utilizes a pair of longitudinally spaced circumferential slots for the emanation of radiation patterns.

Another object of the present invention is to provide an antenna assembly of the last-mentioned type wherein the electromagnetic energy emanating from the aforementioned slots radiate in the same direction so as to provide an overall radiation pattern of improved quality.

Still another object of the present invention is to provide an antenna assembly of the last-mentioned type wherein slot excitation is provided with only one electrical signal feed assembly.

These and other objects and features of the present invention will become more apparent to those skilled in the art from the following description of a preferred embodiment, as illustrated in the accompanying drawings.

DESCRIPTION OF THE PREFERRED EMBODIMENT

Figure 1:
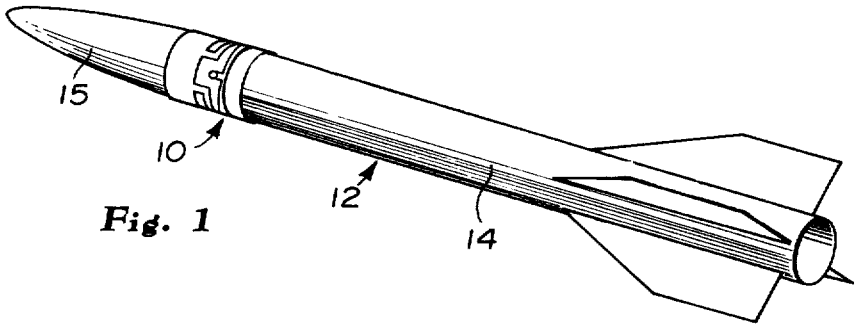
FIG. 1 is a perspective view of a missile utilizing a dual slot antenna assembly constructed in accordance with the present invention.
Figure 2:
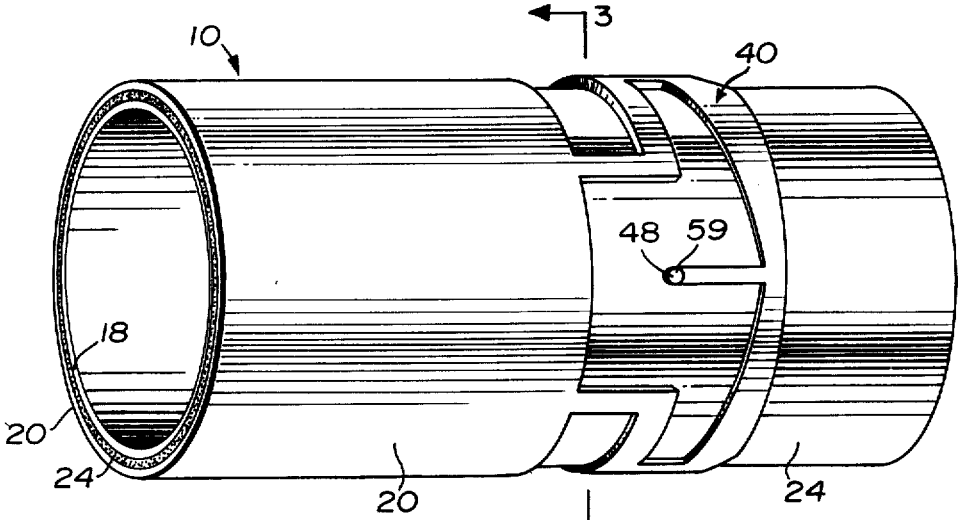
FIG. 2 is an enlarged perspective view of the antenna assembly apart from the missile illustrated in FIG. 1.

Turning now to the drawings, wherein like components are designated by like reference numerals throughout the various figures, a dual slot antenna assembly 10, constructed in accordance with the present invention, is shown in FIG. 1 flush-mounted to a missile 12 having a metallic outer cylindrical body or skin 14 and a nose portion 15. As will be been hereinafter, antenna assembly 10 is characterized by an isotropic antenna radiation coverage, that is an omnidirectional dipole type pattern of constant relative power for any orientation of the antenna. As such, the pattern coverage is then relatively constant regardless of the roll or aspect orientation of missile 12 thereby facilitating data monitoring at a tracking station. For purposes of description, the antenna will be considered as a transmitting device, it being readily apparent to those skilled in the art that the same may be used for reception purposes also.

Turning to FIGS. 2 through 5, antenna 10 is shown to include a thin inner cylindrical conductor 18, preferably constructed of copper, the conductor being adapted for flush mounting directly to and about the skin 14 of missile 12, as illustrated in FIG. 1, and thereby providing, in effect, a ground plane having an axial length equal to that of the missile. Antenna 10 further includes a thin second or outer cylindrical conductor 20, which is also preferably constructed of copper, and which displays an axial length substantially equal to one-half wavelength at the anticipated operating frequency of the antenna. Conductor 20 is positioned concentrically about one end portion of conductor 18 and is radially spaced therefrom so as to define a one-half wavelength coaxial cavity 22, as illustrated best in FIG. 3. In accordance with a feature of the present invention, cavity 22 is electrically opened at both ends thereof so as to provide a pair of exposed circumferential slots 23 and 25 which are longitudinally spaced one-half wavelength apart at the antenna's anticipated operating frequency and which, as will be seen hereinafter, cooperate to produce the aforestated omnidirectional radiation pattern.

While coaxial cavity 22 may be left void of material, for ease of construction a dielectric layer 24, preferably polytetrafluoro ethylene (commercially available Teflon), and particularly Teflon-fiberglass, is positioned between and supports conductors 18 and 20. In this regard, it is to be noted that the actual length of coaxial cavity 18 must be corrected for the impedance-producing effect of the dielectric layer. This may be accomplished by resorting to the relationship of effective wavelength $\lambda c$ as a function of actual wavelength $\lambda$, which relationship is:

$$\lambda c = (\lambda / \sqrt{\epsilon_R})$$

wherein $\lambda c$ is the corrected wavelength in a cavity filled with dielectric material, $\lambda$ is the actual wavelength in a cavity void of material and $\epsilon_R$ is the dielectric constant of the cavity filled material. By utilizing the above-stated equation, the length of cavity 22 easily can be corrected so as to be "effectively" one-half wavelength. However, for purposes of clarity, only the term "one-half wavelength cavity" will be used hereinafter, it being understood that when the cavity is filled with dielectric material, such as material 24, an effective one-half wavelength cavity is contemplated.

Thus, for operation at a carrier frequency of, for example, 2.2 GHz and utilizing a dielectric such as polymerized tetrafluoro ethylene, $\lambda$ is approximately equal to 5.4 inches and $\epsilon_R$ is approximately 2.5 inches. Solving the aforestated equation yields of $\lambda c$ of approximately 3.4 inches. Therefore, the effective one-half wavelength cavity of this example is approximately 1.7 inches in length with slots 23 and 25 being separated the same distance.

Figure 3:
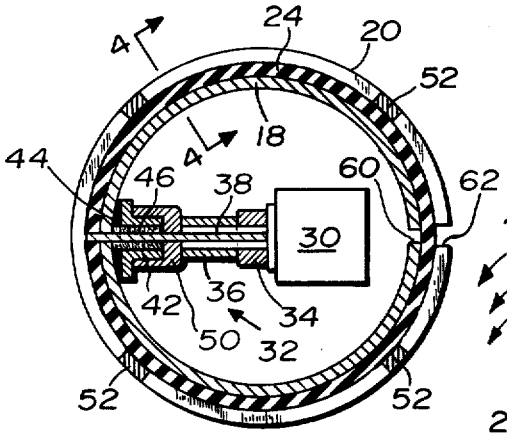
FIG. 3 is a cross-sectional view taken generally along line 3—3 in FIG. 2.

Circumferential slots 23 and 25 may be excited by signal energy produced at a source 30, as seen in FIG. 3, which may be located within missile 12 and which may be of conventional type such as, for example, a unit having an appropriate power source and radio frequency oscillator modulated in accordance with data signals from external environmental sensor devices. In this regard, a single electrical signal feed assembly 32, operating in the TEM mode, is provided for coupling source 30 to the aforementioned slots, as will be seen hereinafter.

As illustrated best in FIG. 3, feed assembly 32 includes a coaxial transmission line 34 having outer and inner conductive cables 36 and 38 extending from within source 30 where they are connected to the appropriate components. The otherwise free end of outer conductive cable 36 is electrically connected to inner conductor 18 while the otherwise free end of inner conductive cable 38 is connected to the input of a combination multiple feed and impedance-matching network 40 which is part of assembly 32 and which is to be described hereinafter.

The connections of the inner and outer conductive cables of transmission line 34 with conductor 18 and network 40, respectively, may be accomplished in any suitable manner, so long as the inner conductive cable is appropriately insulated from inner conductor 18. In this regard, a jack assembly illustrated in FIG. 3, is provided and generally comprises an externally threaded female connector 42 having an integral shoulder 44 suitably mounted to the inner surface of conductor 18 and an internal insulating sleeve 46, the opening of which is axially aligned with an aperture 48 provided radially through antenna 10. Female connector 42 is adapted to receive a cooperating internally threaded male connector 50 mounted to the otherwise free end of conductive cable 36, as illustrated in FIG. 3. In this manner, the last mentioned conductive cable is electrically connected to inner conductor 18 while, on the other hand, inner conductive cable 38 of coaxial transmission line 34 is positioned through insulating sleeve 46 and aligned aperture 48 for connection with combination multiple feed and impedance matching network 40.

Figure 5:
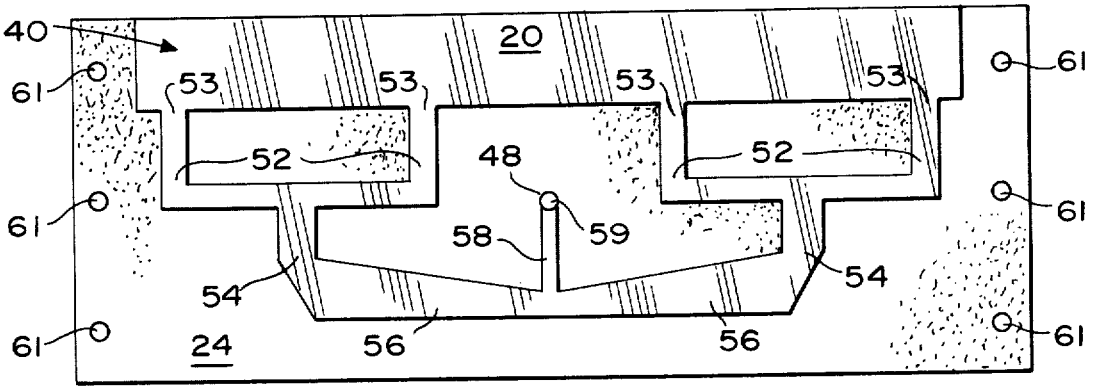
FIG. 5 is an enlarged flattened out view of the antenna illustrated in FIG. 2, specifically displaying a portion of the electrical signal feed assembly used therewith.

Turning to FIG. 5, attention is directed to network 40 which is supported on the exposed side of dielectric layer 24 and which comprises a plurality of thin ribbon-like conductive leads constructed preferably of and displaying the same thinness as outer cylindrical conductor 20. In this regard, it has been found that the most favorable radiation patterns emanating from slots 23 and 25 of coaxial cavity 22 are developed when the slots are excited in the TEM mode with a plurality of uniform phase and amplitude signals provided at feed points generally designated by the reference numeral 53. As illustrated, these feed points are separated about the periphery of circumferential slot 25 (on outer conductor 20) at intervals substantially equal to one wavelength (as corrected for the dielectric material 24 in cavity 22) at the aforestated anticipated operating frequency. Accordingly, network 40 includes a first plurality of leads 52, common ends of which are preferably integrally formed with, but in any case, terminate at feed points 53.

Assembly 40 further includes a plurality of T-shaped leads 54 (two of which are shown in FIG. 5), a third plurality of leads 56 and an input lead 58, all of which combine to connect the first plurality of leads 52 to the inner conductive cable 38 of coaxial transmission line 34 at a signal feed junction designated by the reference numeral 59. As illustrated in FIG. 5, the head of each T-shaped lead connects a pair of adjacent leads 52 while the leads 56 substantially form a continuous band connecting the base of each T-shaped lead to input lead 58. In this regard, it is to be noted that dielectric layer 24 maintains the predetermined orientation between the aforestated leads as well as the inner and outer conductor.

Leads 52, 54, 56 and 58 are suitably dimensioned (length, width and thickness) so as to provide continuous impedance matching between coaxial transmission line 34 and coaxial cavity 22. With the impedance of coaxial transmission line 34 being appropriately chosen so as to match the impedance of source 30, it is readily apparent that there is substantially a perfect impedance match between the source and antenna 10 which, of course, provides for a more efficient antenna. In addition, the distances between input 58 and each feed point 53 are equal. In this manner, combination multiple feed and impedance matching network 40 separates the input signal from coaxial transmission line 34 into a plurality of equal phase and amplitude signals and transfers the same to feed points 53 for exciting slots 23 and 25 in the most favorable manner possible.

While network 40 is formed in the manner illustrated in FIG. 5 and includes four paths to conductor 20, it is to be understood that the invention, as contemplated, is not limited thereto. For example, there may be any number of feed points and paths depending upon the circumference of conductor 20. Accordingly, the paths between input 58 and feed points 53 may take on various dimensions and designs so long as the aforedescribed impedance matching and input signal separation functions are preserved. In this regard, the latter function is assured if the paths are of equal distances.

With antenna device 10 constructed in the aforedescribed manner, attention is now directed to a preferred method of making the same. As stated above, inner and outer cylindrical conductors 18 and 20 are preferably constructed of copper. More specifically, these conductors are preferably parts of a sheet of microstrip, that is, copper-clad layers supported by and on opposite sides of a sheet of dielectric material such as, polytetrafluoro ethylene (commercially available Teflon), the dielectric sheet being dielectric material 24 illustrated in FIG. 2.

The method of making antenna 10 utilizing the aforedescribed sheet of microstrip includes the step of removing various portions of one of the copper-claded layers from the intermediate dielectric insulating sheet so as to provide an integral configuration including outer conductor 20 and combination multiple feed and impedance matching network 40. This may be accomplished in any suitable manner, but is most preferably accomplished by resorting to conventional printed circuit board techniques such as, for example, a photoetching process. Thereafter, aperture 48 is provided through the laminated material at the input or signal feed junction of assembly 40 and a suitable jack assembly of the type described above is soldered or otherwise suitably mounted over the aperture on the opposite side of network 40, in the manner illustrated in FIG. 3.

If the antenna assembly is to be used in the manner shown in FIG. 1, that is, as a wrap-around or cylindrical flush-mounted antenna, the longitudinal edges of the microstrip or laminated material are suitably connected together by any suitable means such as apertures 61 provided through opposite sides of the material as illustrated in FIG. 5. In this regard, construction of antenna device 10 is facilitated by connecting only the lengthwise edges of the intermediate dielectric layer 24 as illustrated by gaps 60 and 62 representing the unconnected lengthwise edges of inner and outer conductors 18 and 20, respectively. So long as these gaps are small relative to the operating wavelengths of the antenna, they may be neglected as having no substantial effect on either the antenna impedance or radiation pattern. In this regard, the longitudinal edges of the laminated material may be connected together after the antenna assembly is wrapped around the body of the propelled vehicle or they may be initially connected together whereupon the assembly is then slid over and about the vehicle's body.

Figure 6:
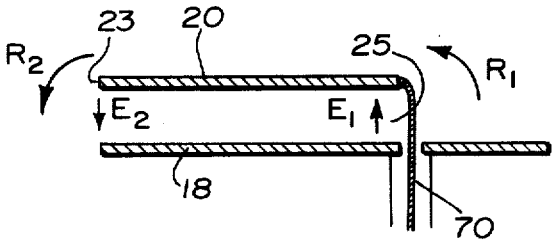
FIG. 6 is a diagrammatic view of a portion of the antenna of FIG. 2, illustrating the manner in which the dual slots operate.

Having described the rather simple and economical manner in which antenna device 10 is constructed, attention is now directed to its operation, which may be best described in conjunction with FIG. 6 illustrating a portion of the antenna assembly diagrammatically. As stated above, circumferential slots 23 and 25 are excited in the TEM mode by a plurality of equal phase and amplitude signals (such as radio frequency signals) which are fed to the cavity at points 53 adjacent slot 25 by electrical signal feed assembly 32. For purposes of clarity, FIG. 6 shows a single conventional coaxial cable 70 which is connected with conductors 18 and 20 adjacent slot 25 and which, for purposes of explanation, represents a portion of feed assembly 32.

Figure 4:
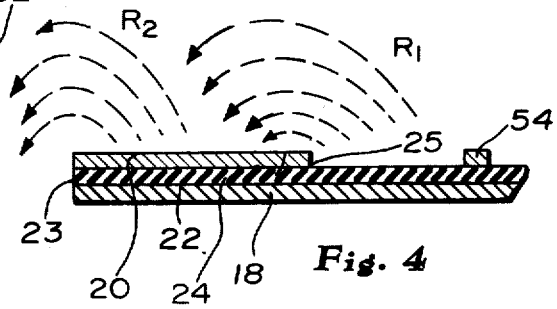
FIG. 4 is a partially broken-away enlarged sectional view taken generally along line 4—4 in FIG. 3 and particularly illustrating the radiation patterns emanating from the antenna's dual slots.

From an impedance standpoint, because circumferential slots 23 ad 25 are electrically in parallel and one-half wavelength apart, slot 25 presents only one-half of the impedance which would otherwise exist if the slot 23 were replaced by a short circuit. This, of course, is an important consideration when matching the impedance of antenna 10 with that of the electrical signal feed assembly 32. Upon exciting coaxial cavity 22, an electric field develops about slot 25 in the direction indicated by arrow $E_1$. This, of course, only represents the instantaneous electric field and will change in accordance with the oscillatory signals exciting the cavity. Since circumferential slot 23 is positioned one-half wavelength from slot 25, the instantaneous electric field shifts 180° thereat, as indicated by arrow $E_2$. In this manner, the electric fields at the two slots are always in opposite directions. Accordingly, the electromagnetic energy emanating from the two slots radiate in the same direction, as indicated by arrows $R_1$ and $R_2$, respectively, and therefore overlap in an additive manner so as to provide a stronger radiation pattern, as illustrated in FIG. 4.

In the case where antenna assembly 10 is utilized in combination with missile 12, as illustrated in FIG. 1, it has been found that the antenna's dual slot feature provides a typical omnidirectional dipole-type radiation pattern, however, displaying more broadside gain and less nulls in the roll axis due to dual slot cooperation. In this regard, it is to be noted that assembly 10 operates effectively at any desired frequency and operates particularly well at frequencies within the VHF, UHF and microwave bands generally and at the aforestated frequency of 2.2 GHz specifically.

Referring to FIG. 6, the aspect radiation pattern developed by antenna device 10 utilized in the manner illustrated in FIG. 1 is shown, wherein the axis of the missile was positioned substantially within the plane containing the pattern and wherein the assembly was operated at a frequency of 2.2 GHz. It is to be understood that this particular frequency is provided for illustrative purposes only and is not intended to limit the invention, the assembly operating equally well at other desired frequencies.

Figure 7:
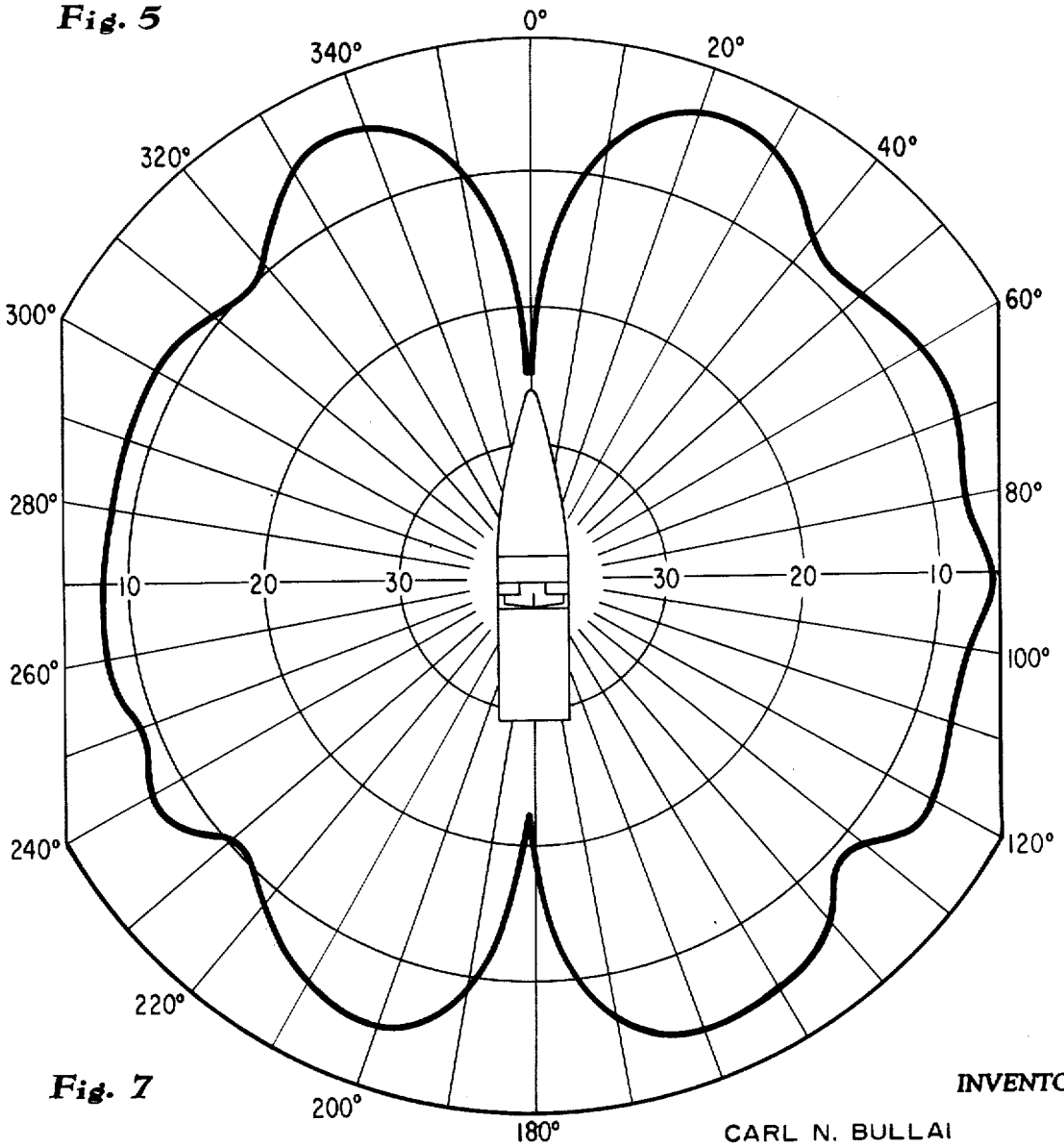
FIG. 7 is a graphic representation showing an experimental antenna gain radiation pattern utilizing the antenna of FIG. 2.

The pattern, representing the antenna gain relative to linear isotropic radiation, is substantially representative within one db of the infinite number of aspect radiation patterns which may be utilized to define a figure of revolution about the missile axis. More particularly, the radiation pattern of FIG. 7 is substantially representative of the pattern contained in any plane defining a cross section for any figure of revolution produced by all aspect patterns containing the axis of the missile.

It readily may be appreciated that deep nulls exist only directly forwardly (0°) and rearwardly (180°) of the missile, that is, at the tip and tail thereof. As is well known, tip and tail pattern nulls in a telemetry missile are usually of little concern. As can also be seen from FIG. 7, the remainder of the signal pattern displays an average strength variation between peaks and nulls in the aspect plane of less than 5 db. Thus, the improved antenna device is highly favorable for receipt of transmission of electromagnetic signal energy to or from the missile without any appreciable loss in the signal due to the vehicle orientation.

It is to be understood that while antenna device 10 has been described both operationally and in construction as a cylindrical flush mountable-type antenna displaying an omnidirectional radiation pattern, the invention is not limited thereto. Specifically, antenna device 10 may be substantially flat or only partially curved so as to provide a more directional radiation pattern while retaining the various advantageous features described above. In addition, although only one embodiment of the invention has been shown and described, various modifications as may appear to those skilled in the art are intended to be within the contemplation of the invention as defined in the scope of the claims.

What is claimed is:

1. A dual slot antenna assembly comprising: a pair of laterally spaced-apart conductive elements electrically isolated with respect to one another, said conductive elements defining a pair of radiation slots longitudinally spaced-apart a predetermined distance approximately equal to one-half wavelength at the anticipated operating frequency of said assembly, each of which slots emanates radiation therefrom such that the radiation patterns developed are in substantially the same direction, said slots being of greater length than the spacing between said conductive elements; and electrical signal feed means connected with said conductors for electrically exciting both of said slots, said electrical signal feed means including a plurality of leads connected to an edge of one of said conductive elements adjacent one of said slots and spaced-apart at intervals at least substantially equal to one wavelength at said anticipated operating frequency.

2. An assembly according to claim 1 including nonconductive means for supporting said laterally spaced-apart conductive elements, said conductive elements and nonconductive means each comprising part of a single sheet of dielectric material metallically cladded on opposite sides thereof.

3. A dual slot antenna assembly comprising: a first substantially cylindrical conductor, the axial length of which is approximately equal to one-half wavelength at the anticipated operating frequency of said assembly; a second substantially cylindrical conductor, the axial length of which is at least equal to the axial length of said first conductor, said second conductor being positioned concentrically within and radially spaced from said first conductor and electrically isolated with respect thereto so as to define a pair of circumferential slots spaced one-half wavelength apart at said anticipated operating frequency and providing independent radiation patterns emanating in the same direction; and electrical signal feed means connected with said conductor for electrically exciting both of said slots, said electrical signal feed means including a plurality of leads connected to an edge of said first conductor adjacent one of said slots and circumferentially spaced-apart at intervals at least substantially equal to one wavelength at said anticipated operating frequency.

4. An assembly according to claim 3 including nonconductive means for supporting said first and second conductors, said conductors and nonconductive means each comprising part of a single sheet of dielectric material metallically cladded on opposite sides thereof.

*5. A dual slot antenna assembly comprising:*

*a pair of laterally spaced-apart conductive elements separated with respect to one another by a sheet of dielectric material,*

*one of said conductive elements being of larger dimensions and underlying the other element and defining an electrical reference or ground surface;*

*said conductive elements defining a pair of radiation slots between opposing edges of said other element and said reference surface, said radiation slots being longitudinally spaced-apart a predetermined distance approximately equal to one-half wavelength at the anticipated operating frequency of said assembly,*

*each of which radiation slots emanates radiation therefrom such that the radiation patterns developed are in substantially the same direction;*

*said radiation slots having a length dimension equal to the entire length of said opposing edges, which length dimension is greater than the spacing between said conductive elements; and*

*a single electrical signal feed assembly integrally connected with said other conductive element at only one of said opposing edges for electrically exciting both of said radiation slots from a single signal feed junction.*

*6. An assembly according to claim 5 wherein said conductive elements and said sheet of dielectric material each comprise part of a single sheet of dielectric material metallically cladded on opposite sides thereof.*

*7. An antenna structure comprising:*

*an electrically conducting ground surface,*

*a single layer electrically conducting surface comprising both an r.f. radiator conducting area and an r.f. feedline conducting area integrally connected thereto and formed therewith,*

*a dielectric sheet disposed between said ground surface and the single layer electrically conducting surface,*

*said conducting surfaces defining a pair of radiation slots between opposing edges of said r.f. radiator and said ground surface, said radiation slots being longitudinally spaced apart by a predetermined distance approximately equal to one-half wavelength at the anticipated operating frequency of said antenna structure;*

*each of which radiation slots emanates radiation therefrom such that radiation patterns developed are in substantially the same direction;*

*said radiation slots having a length dimension equal to the entire length of said opposing edges, which length dimension is greater than the spacing between said surfaces; and*

*said r.f. feedline being connected to the outside edge of one only of said opposing edges of said r.f. radiation conducting area to at least one predetermined point on the periphery of said radiator conducting area.*

* * * * *

UNITED STATES PATENT AND TRADEMARK OFFICE

CERTIFICATE OF CORRECTION

PATENT NO. : Re. 29,296

DATED : Reissued July 5, 1977

INVENTOR(S) : Jack R. Krutsinger et al

It is certified that error appears in the above-identified patent and that said Letters Patent are hereby corrected as shown below:

Column 2, line 20, after "greater" insert --length--.

Column 10, line 20, change "radiation" to --radiator--.

Signed and Sealed this

*Twentieth* Day of *November 1979*

[SEAL]

*Attest:*

RUTH C. MASON
*Attesting Officer*

LUTRELLE F. PARKER
*Acting Commissioner of Patents and Trademarks*